United States Patent
Lee et al.

(10) Patent No.: US 9,456,298 B2
(45) Date of Patent: Sep. 27, 2016

(54) DEVICE-TO-DEVICE LOCATION AWARENESS

(75) Inventors: Michael M. Lee, San Jose, CA (US); Justin Gregg, San Francisco, CA (US); Chad G. Seguin, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 907 days.

(21) Appl. No.: 12/185,598

(22) Filed: Aug. 4, 2008

(65) Prior Publication Data

US 2010/0029302 A1    Feb. 4, 2010

(51) Int. Cl.
*H04W 24/00* (2009.01)
*H04W 4/02* (2009.01)
*H04W 4/20* (2009.01)
*H04L 29/08* (2006.01)
*H04W 4/00* (2009.01)
*H04W 8/18* (2009.01)

(52) U.S. Cl.
CPC ............... *H04W 4/02* (2013.01); *H04L 67/18* (2013.01); *H04W 4/20* (2013.01); *H04W 8/183* (2013.01)

(58) Field of Classification Search
CPC .. H04W 64/00; H04W 4/14; H04M 1/72519
USPC ................ 455/456.6, 456.2, 466, 550.1
See application file for complete search history.

(56) References Cited

U.S. PATENT DOCUMENTS

| | | | |
|---|---|---|---|
| 6,871,278 B1* | 3/2005 | Sciupac | 713/185 |
| 7,136,631 B1* | 11/2006 | Jiang et al. | 455/414.1 |
| 2004/0203603 A1* | 10/2004 | Pierce et al. | 455/411 |
| 2006/0030339 A1* | 2/2006 | Zhovnirovsky | H04W 4/02 455/456.6 |
| 2006/0046744 A1* | 3/2006 | Dublish et al. | 455/456.3 |
| 2006/0227047 A1* | 10/2006 | Rosenberg | 342/357.13 |
| 2006/0252431 A1* | 11/2006 | Mullen | 455/456.1 |
| 2007/0036296 A1* | 2/2007 | Flanagan et al. | 379/88.19 |
| 2007/0054739 A1* | 3/2007 | Amaitis et al. | 463/42 |
| 2007/0243886 A1* | 10/2007 | Taniguchi | 455/456.4 |
| 2008/0132252 A1* | 6/2008 | Altman et al. | 455/457 |
| 2008/0254811 A1* | 10/2008 | Stewart | 455/456.2 |
| 2008/0280591 A1* | 11/2008 | Opaluch | H04M 11/04 455/410 |
| 2009/0098888 A1* | 4/2009 | Yoon | 455/456.2 |
| 2009/0181699 A1* | 7/2009 | Tysowski | 455/457 |

* cited by examiner

*Primary Examiner* — Muthuswamy Manoharan
(74) *Attorney, Agent, or Firm* — Kilpatrick Townsend & Stockton LLP

(57) ABSTRACT

During an ongoing wireless telephone call communication session between a pair of mobile devices, a local device responds to its user's activation of a virtual or actual button or key, or its user's verbal command, by automatically sending an over the air message (e.g., a SMS or text message or other network communication message) to the remote device. The message requests location information of the remote device. Upon obtaining location information from the remote device, a location of the remote device is automatically displayed on the local device. Other embodiments are also described and claimed.

24 Claims, 5 Drawing Sheets

DEVICE-TO-DEVICE LOCATION AWARENESS

An embodiment of the invention is related to mobile or portable voice communication devices that have built-in location awareness capabilities. Other embodiments are also described.

BACKGROUND

While continuing to grow in popularity, portable or mobile electronic devices, such as cellular phones have also been growing in complexity. In addition to supporting wireless voice communication, devices such as the IPHONE multifunction device by Apple Inc., include additional functionality such as a built-in digital camera, digital music and movie file playback, and self-location capability. Multifunction devices now have built-in global positioning system (GPS) receivers that can compute the current geographic location of the device. This feature has been used in map applications, where the device can automatically find and display a route to a desired destination, from the current location calculated by the GPS receiver. In addition, there are current services offered for cellular phones that allow a user of a cell phone to alert a friend's cell phone about his current location. The service also allows the user to request that his cell phone show the location of previously identified cell phones (that have self-location capability).

SUMMARY

Several techniques that facilitate device-to-device location awareness during a telephone call are described. One embodiment of the invention is a method for communications between a first mobile device and a second mobile device, described as follows. During an ongoing telephone call (communication session) between the first and second devices, an over the air message (e.g., a short message service, SMS, or text message) is sent from the first device. This may be in response to a user activating a designated virtual or physical button of the first device, or giving a verbal command, to send a location request message. The message requests the current location of the second device. It may also be viewed as requesting permission to reveal the current location to the user of the first device. An RF-based locating methodology that determines location information of the second device is then performed. This determined location information is then sent to the first device and can be automatically displayed to its user. Thus, this technique enables a person who is on a call with another person and who would like to meet the other person, to immediately find out the location of the other person.

To ensure privacy, the user of the second device may be prompted to give permission to release her location information (e.g., by actuating a virtual or physical button on the second device), during the ongoing telephone call. Alternatively, a stored profile of the user of the second device may be checked, for automatically obtaining permission to release location information to the requesting device.

The above-described process for location awareness may occur directly between the two mobile devices. For instance, the initial request for location information from the first device may be received by the second device as an SMS or text message sent from the first device. The second device can then send its location information back to the first device, via another SMS or text message. In that case, there is no requirement for modifying any cellular telephony network infrastructure to deploy such a service, so long as each of the devices has the needed device-to-device location awareness application running (that can accept a location request text message and reply by sending a location information and permission text message.

From the point of view of the first device, during the ongoing telephone call, the user of the first device activates a virtual or actual button or key on the first device that causes the first device to automatically send an over the air message to the second device. The virtual button may be located in a contacts list or address book screen of the first device, and/or in the front screen of the first device during the ongoing telephone call. The second device then acts upon this request for location information and replies back with its current, calculated location information (if permitted by the second user). In the first device, upon receiving the current location information for the second device, the location is then automatically displayed to the first user (e.g., as a pointer or marker on a map, juxtaposed with a marker representing the current, calculated location of the first device).

From the point of view of the second device, during an ongoing call, the second user may be prompted (by the second device) to authorize release of her current location information to the requesting first user. Once authorization has been obtained (e.g., by the second user actuating a virtual or physical "OK" button of the second device), the second device composes and sends a message to the first device that contains its current location information.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
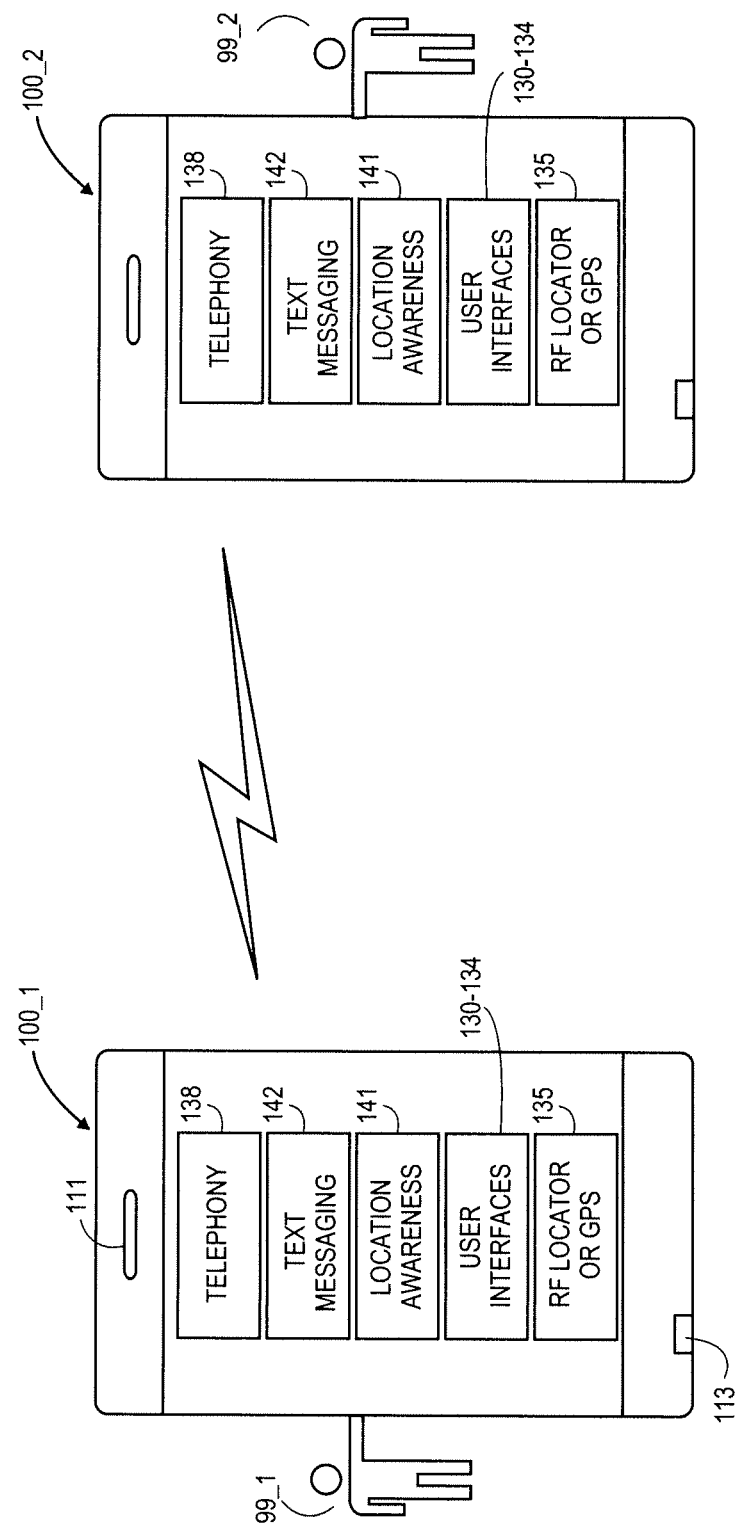
FIG. 1 is a block diagram of a pair of mobile devices that have location awareness capability.

Beginning with FIG. 1, a block diagram of a pair of example mobile devices 100_1, 100_2 is shown. Each device is associated with its respective user 99_1, 99_2. The device 100 may be a multifunction device, such as the IPHONE device by Apple Inc. It may be used as a cellular telephony handset by its user, to make and receive wireless voice calls. As in a conventional cell phone handset, the device 100 has a speaker 111 which is located near the top of the device—this is also referred to as a receiver or earpiece. A microphone 113 (or mouthpiece) is located near the bottom end of the device.

The device 100 also includes any suitable combination of hardware circuitry and software for implementing several functions at a "local" level. These may include: a telephony module 138 that manages wireless telephone call communication sessions with "remote" devices; a messaging module 142 that may send and receive network communication messages (e.g., SMS or text messages, transport control protocol/internet protocol (TCP/IP) messages, user datagram protocol (UDP) messages, and cellular network control messages) during a wireless telephone call session; user interface modules 130-134 that can display messages on a touch screen, detect a user's activation of a virtual or actual button or key in the device, and in some embodiments perform speech recognition to interpret the user's verbal command given to the device; and an RF locator or GPS module 135 that can determine the current location of the device using an RF-based locating methodology. A location awareness module 141 may have the following local functionality in the first device 100_1: it may prompt its user regarding sending a location request to another user, respond to its user's activation of a designated button, key or verbal command for giving permission to release location information, and instruct the messaging module 142 to send an SMS or text message, addressed to the other user's mobile phone device (remote device) with which there is an ongoing telephone call. The message may contain a location request and perhaps the current location information of the first device 100_1. When the current location information of the remote device has been received in the device 100_1, the location awareness module 141 may instruct the user interface modules to display the current location of the remote device.

The other mobile device 100_2 may have similar functionality as the device 100_1, including another instance of the telephony module 138 that enables the second user to participate in the telephone call with the user of the other device 100_1, another instance of the text messaging module 142 that receives the location request message from the device 100_1, and another instance of the location awareness module 141 that in response to learning of the received location request message, checks for permission to release location information of the device 100_2. If there is permission, then it instructs the text messaging module 142 to send a reply message back to the first device 100_1 that contains the current location information (obtained from another instance of the RF locator or GPS module 135). In some cases, checking for permission to release location information involves prompting the user of the second device 100_2 to give real-time approval to release location information to the user of the first device 99_1. This may be done by the location awareness module 141 instructing the user interfaces 130-134 to display a graphic to that effect during the phone call, and accept a yes or no command from the second user 99_2.

Figure 2:
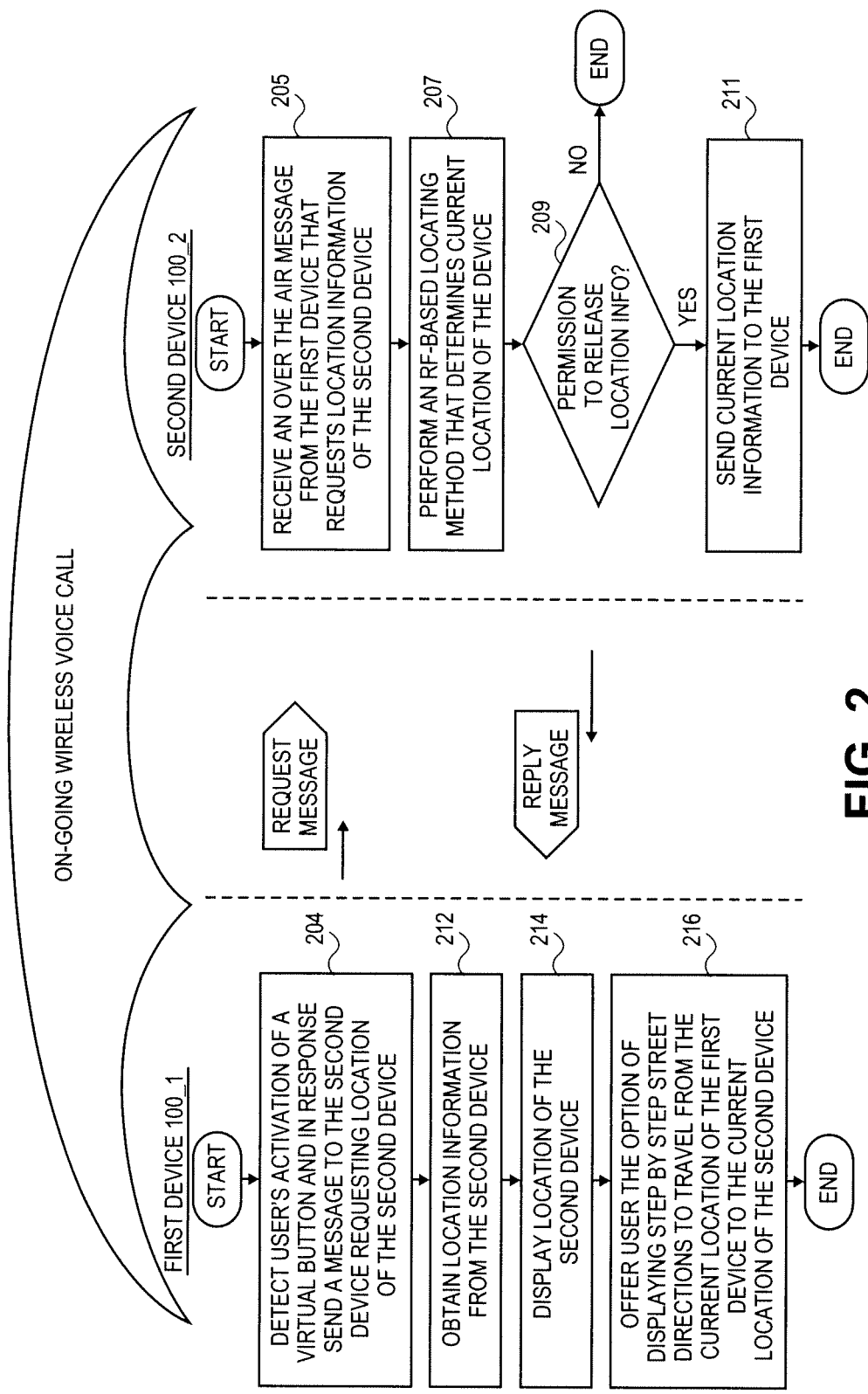
FIG. 2 a flow diagram of the communications methodology between two users using their respective mobile devices for location awareness.

A flow diagram of an example communications methodology between the two users using their respective mobile devices 100_1, 100_2 is depicted in FIG. 2. Operation begins during an ongoing wireless voice call to which the first and second users are participating using their respective devices 100_1, 100_2. Note that the reference to "voice call" here is not limited to a conventional, sound-only conversation. It may also include video of the two users, synchronized with their audio. The call may be a cellular network telephone call that has been initiated by either user.

The voice call may be one where the two users are discussing a plan to meet each other. The first user, for example, may be waiting for the second user to arrive at the location of the first user, but the second user may have lost his way. Thus, during the conversation, the first user decides that it may be best to locate the second user and obtain step-by-step street directions from the current location of the first user to that of the second user, or vice versa. Another scenario may be that the first user wishes to let the second user know his current location, such that the device 100_2 of the second user may automatically provide step-by-step directions to travel from the current location of the second user to that of the first user.

During the ongoing wireless voice call, the device 100_1 may have a virtual or actual button or key that once activated by the first user causes a message to be sent to the second device 100_2, requesting location information of the latter (block 204). This request message may be composed and then sent by the device 100_1 and may be addressed to the device 100_2, based on knowledge of the fact that the device 100_2 is participating in the ongoing wireless voice call.

The location request message may be a SMS text message that is addressed to the cellular phone number of the second device 100_2. The cellular phone number of the device 100_2 may have been obtained as follows. If it was the device 100_1 that initiated the call, then the phone number of the device 100_2 was entered by the first user (e.g., through a keypad of the device 100_1, or it was looked up by the device 100_1 in the first user's stored contacts list or address book). If the call, however, was initiated by the second user using the device 100_2, then the phone number may have been obtained through a caller ID received in the first device 100_1 (e.g., via an automatic number identification, ANI, signal received by the first device when the call was initiated).

The location request message is ultimately received in the second device 100_2 (block 205). The message is then interpreted (by the location awareness module 141) to mean that the device 100_1 is requesting the current location of the second device. The second device 100_2 may then perform an RF-based locating method that determines the current location (block 207). This may be performed using a built-in GPS receiver of the second device.

In addition to obtaining its own current location, the second device will also need to check for permission before releasing this location information (block 209). For privacy reasons, the user of the second device may not wish to have her current location released automatically to another user. One way to obtain permission is to prompt the second user, in response to receiving the request message from the first user, to give permission to release location information. This may be done by, for example, playing a verbal alert to the second user (during the ongoing voice call). Alternatively, a graphical alert may be displayed by the device 100_2 ("The user at 310-717-4611 is requesting your location. OK to release?"). In either scenario, some form of real-time confirmation from the second user needs to be received, before the device 100_2 can release location information to the first user. This confirmation may be in the form of a verbal command by the second user (that is correctly interpreted by a voice recognition module of the second device), or it may be a virtual or physical selection or pressing of a button in the device 100_2. If no permission is obtained, then a reply message may be sent back to the first device indicating that, for example, the first user has refused permission to release her location. If, however, permission to release has been obtained, then the reply message may contain the current location information (e.g., GPS location coordinates) that has been determined for the second device (block 211).

Note that in block 209, an alternative to prompting the user (for obtaining the permission in real-time) is for the second device to automatically check its stored profile of the second user, for previously given permissions to release location information. For instance, the second user may have programmed the second device with a list of friends and family (and their respective mobile device addresses) who may automatically obtain the second user's location. When checking the stored profile of the second user, an address of the first device may be compared (by the location awareness module 141) to addresses in the stored profile. For instance, when using phone numbers, the second device can compare the phone number of the first device to stored phone numbers of friends and family of the second user that are authorized to be automatically given location information. Another way to check the stored profile is to compare a name of the first user or other identifier associated with the first device, to a corresponding stored list of such names or identifiers in the second user's contacts list/address book.

In block 211, the reply message containing the current location information of the second device (e.g., in the form of GPS calculated coordinates) is sent to the first device. In addition to containing the current location information (or a refusal to release such information), the reply message may be addressed directly to the first device 100_1, for example, as a SMS or text message. This address may be obtained either through automatic number identification of the first device (in the case where the first device initiated the call), or through input by the second user (through keypad entry at the time the second device initiates the call or through a look up of a previously stored contact list/address book of the second user).

After block 211 where the reply message is sent, the process continues in the first device 100_1 where the reply message is received, thereby allowing the first device to obtain location information of the second device (block 212). The location of the second device is then displayed to the first user (block 214). In other words, in block 214, the location of the second device is not displayed until after having received permission from the second device or its user. This display may be in the form of a street map that contains a pointer or marker at the current location of the second device. The view of this map should be sufficiently wide so as to also show at the same time a marker at the location of the first device, thereby allowing the first user to obtain a better understanding of the distance between his current location and that of the second user (with whom he is having an ongoing telephone conversation).

The device 100, and in particular the location awareness module 141, may have the further ability of offering its user the option of displaying step-by-step street directions, to travel from the current location of that device to the current location of the remote device (block 216). Thus, the location awareness module 141 running in the first device 100_1 could prompt the first user 99_1 as to whether or not he would like to see step-by-step directions to travel from their current location to that of the second device 100_2.

Referring back to block 204, in which a location request message is sent requesting location of the second device, the message could also contain the current location information of the first device 100_1 (recently computed by, for example, a GPS or other RF-based locating methodology running in the first device 100_1). This may be part of a balanced or two-way location information exchange protocol, i.e. "Show me yours and I'll show you mine", to which the second device may be subscribed.

Figure 3:
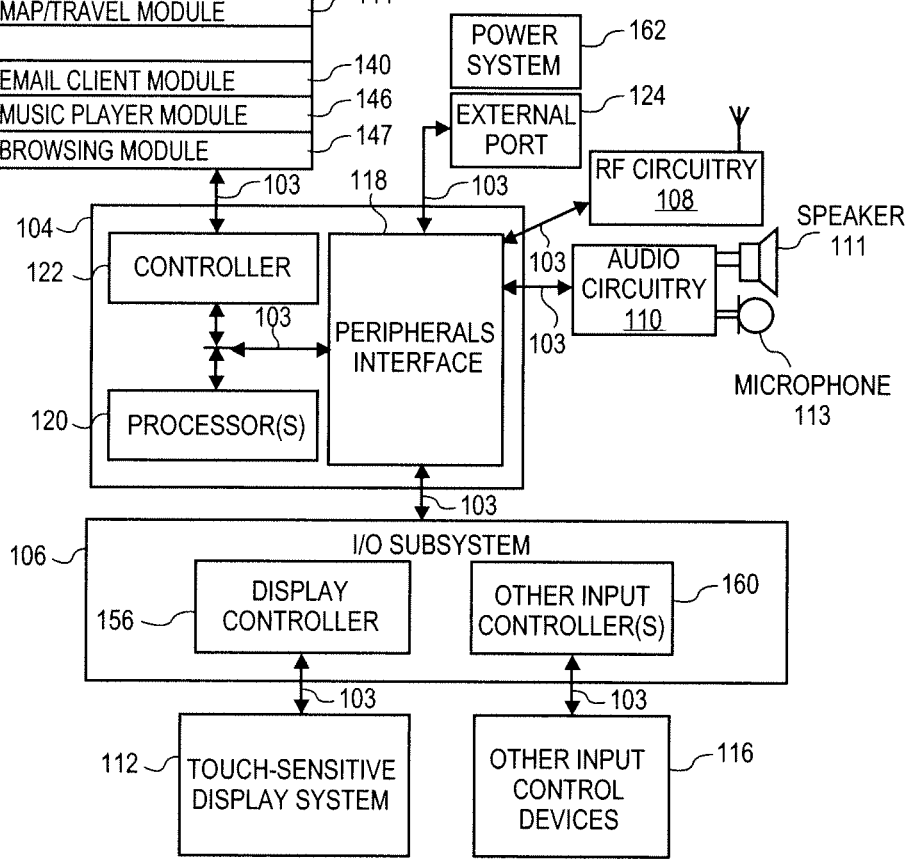
FIG. 3 shows a block diagram of various hardware and software components of an example mobile device.
Figure 3:
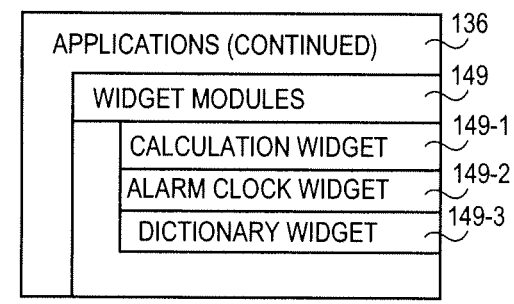
Figure 4:
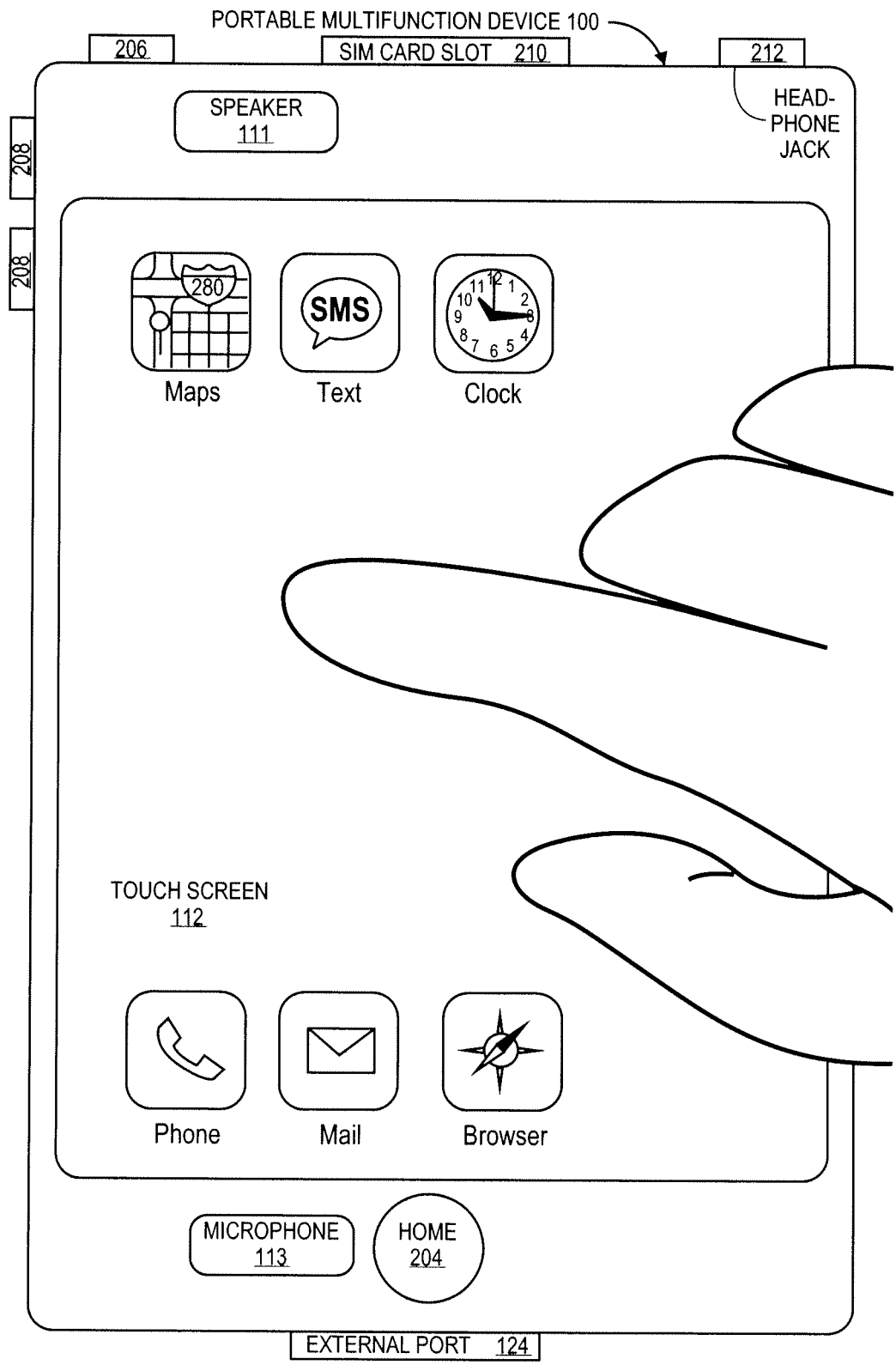
FIG. 4 is a top view of the example mobile device.
Figure 5:
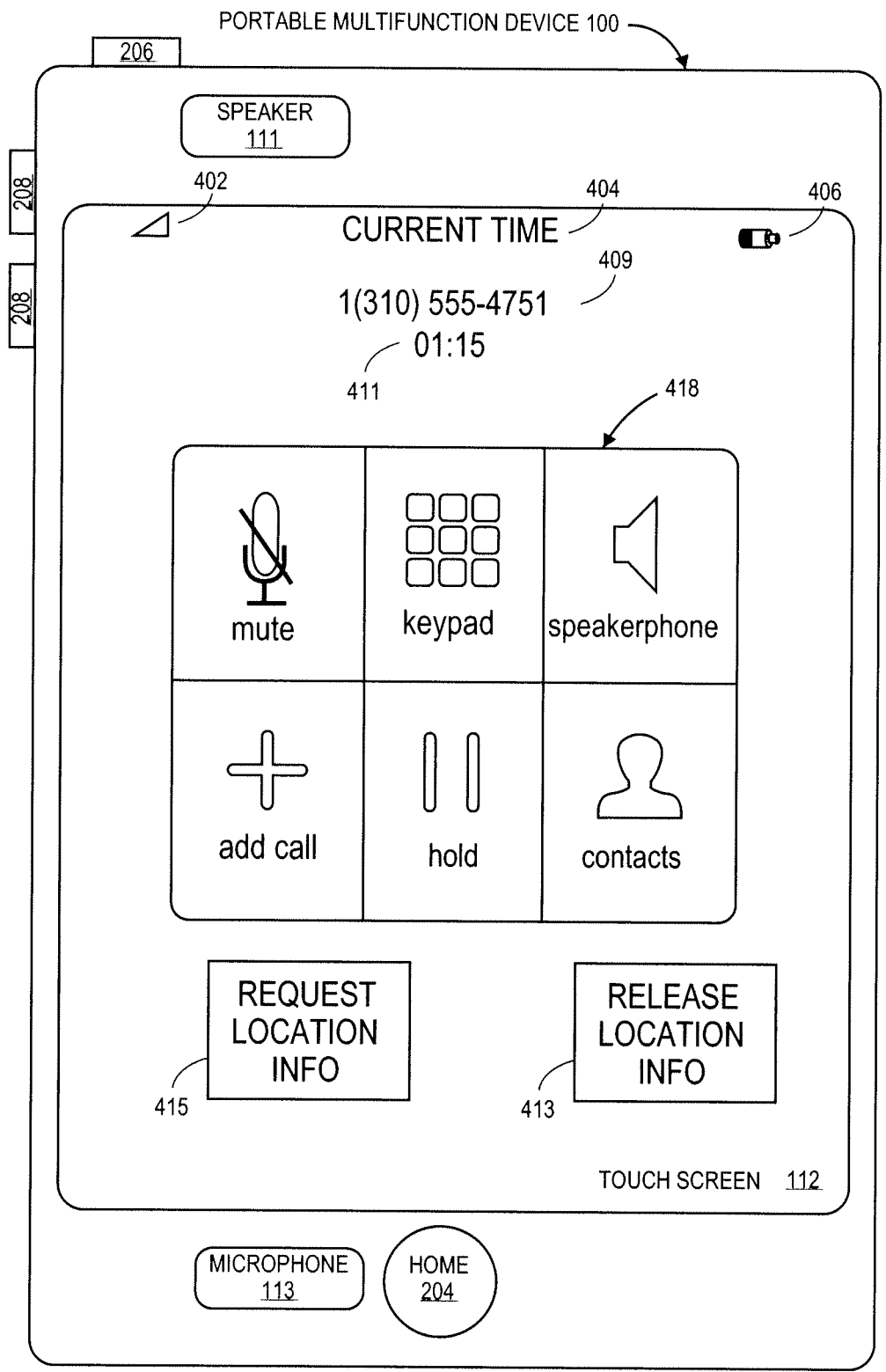
FIG. 5 shows the touch screen of the example device during a call.

Having described the applications that may be running in a pair of mobile devices performing a location awareness process during an ongoing telephone call, FIGS. 3-5 are now described to provide an example implementation of the hardware and software within such a device. Beginning with FIG. 3, a block diagram of various hardware and software components of an example mobile device 100 (portable multifunction device) is shown. The device 100 may be a portable wireless communications device, such as a cellular telephone, that also contains other functions such as personal digital assistant and digital media (music and/or movie) playback functions. Not all of the functions described here are needed, as the device 100 could alternatively be a dedicated, handheld cellular telephone device without, for example, having an email client module, a music player module, or a browsing (web) module. The device 100 has memory 102 which may include random access memory, non-volatile memory such as disk storage, flash memory, and/or other suitable digital storage. Access to the memory 102 by other components of the device, such as one or more processors 120 and peripheral interface 118, may be controlled by a memory controller 122. The latter components may be built into the same integrated circuit chip 104, or they may each be part of a separate integrated circuit package.

The peripheral interface 118 allows input and output (I/O) peripherals of the device to communicate with the processors 120 and memory 102. In one example, there are one or more processors 120 that run or execute various software programs or sets of instructions (e.g., applications or modules) that are stored in memory 102, to perform the various functions described below, with the assistance of or through the I/O peripherals.

The portable multifunction device 100 may have wireless communications capability enabled by radio frequency (RF) circuitry 108 that receives and sends RF signals via an integrated or built-in antenna of the device 100 (not shown). The RF circuitry may include RF transceivers, as well as digital signal processing circuitry that supports cellular network or wireless local area network protocol communications. The RF circuitry 108 may be used to communicate with networks such as the Internet with such protocols as the World Wide Web, for example. This may be achieved through either the cellular telephone communications network or a wireless local area network, for example. Different wireless communications standards may be implemented as part of the RF circuitry 108, including global system for mobile communications (GSM), enhanced data GSM environment (EDGE), high speed downlink packet access (HSDPA), code division multiple access (CDMA), Bluetooth, wireless fidelity (Wi-Fi), and Wi-Max.

The device 100 in this example also includes audio circuitry 110 that provides an interface to acoustic transducers, such as a speaker 111 (a speaker phone, a receiver or a headset) and a microphone 113. These form the audio interface between a user of the device 100 and the various applications that may run in the device 100. The audio circuitry 110 serves to translate digital audio signals produced in the device (e.g., through operation of the processor 120 executing an audio-enabled application) into a format suitable for output to a speaker, and translates audio signals detected by the microphone 130 (e.g., when the user is speaking into the microphone) to digital signals suitable for use by the various applications running in the device. In some embodiments, the audio circuitry may also include a headset jack 212 (see FIG. 4), which enables sound output by a headset worn by the user of the device.

The device 100 also has an I/O subsystem 106 that serves to communicatively couple various other peripherals in the device to the peripheral interface 118. The I/O subsystem 106 may have a display controller 156 that manages the low level processing of data that is displayed on a touch sensitive display system 112 and generated by a touch sensitive surface of the system 112. One or more input controllers 160 may be used to receive or send signals from and to other input control devices 160, such as physical buttons (e.g., push buttons, rocker buttons, etc.), dials, slider switches, joy sticks, click wheels, and so forth. In other embodiments, the input controller 160 may enable input and output to other types of devices, such as a keyboard, an infrared port, a universal serial bus, USB, port, or a pointer device such as a mouse. Physical buttons may include an up/down button for volume control of the speaker 111 and a sleep or power on/off button of the device. In contrast to these physical peripherals, the touch sensitive display system 112 (also referred to as the touch screen 112) is used to implement virtual or soft buttons as described below.

The touch sensitive screen 112 is part of a larger input interface and output interface between the device 100 and its user. The display controller 156 receives and/or sends electrical signals from/to the touch screen 112. The latter displays visual output to the user, for example, in the form of graphics, text, icons, video, or any combination thereof (collectively termed "graphics" or image objects). The touch screen 112 also has a touch sensitive surface, sensor, or set of sensors that accept input from the user based on haptic and/or tactile contact. These are aligned directly with the visual display, typically directly above the latter. The touch screen 112 and the display controller 156, along with any associated program modules and/or instructions in memory 102, detect contact, movement, and breaking of the contact on the touch sensitive surface. In addition, they convert the detected contact into interaction with user-interface objects (e.g., soft keys, program launch icons, and web pages) whose associated or representative image objects are being simultaneously displayed on the touch screen 112.

The touch screen 112 may include liquid crystal display technology or light emitting polymer display technology, or other suitable display technology. The touch sensing technology may be capacitive, resistive, infrared, and/or surface acoustic wave. A proximity sensor array may also be used to determine one or more points of contact with the touch screen 112. The touch screen 112 may have a resolution in excess of 100 dpi. The user may make contact with the touch screen 112 using any suitable object or appendage, such as a stylist, a finger, and so forth. In some embodiments, the user interface is designed to work primarily with finger-based contacts and gestures, which are generally less precise than stylist-based input due to the larger area of contact of a finger. The device in that case translates the rough finger-based input into a precise pointer/cursor position or command for performing the action desired by the user.

The device 100 has a power system 162 for supplying electrical power to its various components. The power system 162 may include a power management system, one or more replenishable or rechargeable power sources such as a battery or fuel cell, a replenishing system, a power or failure detection circuit, as well as other types of circuitry including power conversion and other components associated with the generation, management and distribution of electrical power in a portable device.

The device 100 shown in FIG. 3 may also include a communication module 128 that manages or facilitates communication with external devices over an external port 124. The external port 124 may include a universal serial bus port, a fire wire port, or other suitable technology, adapted for coupling directly to an external device. The external port 124 may include a multi-pin (e.g., a 30 pin) connector and associated circuitry typically used for docking the device 100 with a desktop personal computer.

Turning now to the program modules in more detail, the contact/motion module 130 may detect user initiated contact with the touch screen 112 (in conjunction with the display controller 156), and other touch sensitive devices e.g., a touchpad or physical click wheel. The contact/motion module 130 has various software components for performing operations such as determining if contact with the touch screen has occurred or has been broken, and whether there is movement of the contact and tracking the movement across the touch screen. Determining movement of the point of contact may include determining speed (magnitude), velocity (magnitude and direction), and/or acceleration of the point of contact. These operations may be applied to single contacts (e.g., one finger contacts) or to multiple simultaneous contacts (e.g., multi-touch or multiple finger contacts).

The graphics module 132 has various known software components for rendering and displaying graphics on the display of the touch screen 112 including, for example, icons of user interface objects such as soft keys and a soft telephone keypad. The text input module 134, which may be a component of graphics module 132, provides soft key-boards or keypads for entering letters and numbers for example. Such soft keyboards and keypads are for use by various applications e.g., the contacts module 137 (address book updating), email client module 140 (composing an email message), browsing module 147 (typing in a web site universal resource locator), and telephone module 138 (for managing a wireless telephone call communications session between the device 100 itself and other telephone devices, including other portable multifunction devices).

The GPS module 135 determines or computes the current geographic location of the device and provides this information for display or use by other applications, such as by a the telephone module 138 for user in location-based dialing and applications that provide location-based services, such as a weather widget, local Yellow Page widget, or map/navigation widgets (not shown). The widget modules 149 depicted here include a calculation widget which displays a soft keypad of a calculator and enables calculator functions, an alarm clock widget, and a dictionary widget that is associated or tied to the particular human language set in the device 100.

Other modules that may be provided in the device 100 include a map/travel module 144 that can display a street map of the current location of the device and obtain step-by-step street directions to a destination selected by the user, or as described above, obtained by the location awareness module 141 from another device with which there is an ongoing telephone call. A music player module 146 may manage the downloading, over the Internet or from a local desktop personal computer, of digital media files, such as music and movie files, which are then played back to the user through the audio circuitry 110 and the touch sensitive display system 112.

It should be noted that each of the above-identified modules or applications correspond to a set of instructions to be executed by a machine such as the processor 120, for performing one or more of the functions described above. These modules or instructions need not be implemented as separate programs, but rather may be combined or otherwise rearranged in various combinations. For example, the text input module 134 may be integrated with the graphics module 132.

In one embodiment, the device 100 is such that most of its functions are performed exclusively through the touch screen 112 and/or a touchpad. By using the touch screen and/or touchpad as the primary input and output control device, the number of physical input and control devices, such as push buttons, dials, and the like on the device may be reduced. In some embodiments, the touchpad may be referred to as a "menu button". In other embodiments this menu button may include a physical push button or other physical motion input control device, instead of a touchpad. This case is illustrated in the example of the device 100 shown in FIG. 4 where a home button 204, when pressed by the user, causes the display to show the main, home or root menu of the graphical user interface. FIG. 4 is a top view of the device 100, in the situation where the home button 204 has been actuated and the touch screen 112 is displaying the graphical or image objects associated with the home or root menu. The image objects of several modules or applications are displayed, including those of the email client module 140 ("Mail"), telephone module 138 ("Phone"), browsing module 147 ("Browser"), map/travel module 144 ("Map"), text messaging module 142 ("Text"), and alarm clock widget 149_2 ("Clock"). These are just some examples of how applications can be grouped in the root menu of the device. The user may customize the root menu to display image objects of other application groupings.

Still referring to FIG. 4, this top view of the example portable multifunction device shows that its touch screen 112 is surrounded by various sensors and peripheral devices, including speaker 111 and microphone 113. The speaker 111 may be a receiver (earpiece) that is positioned near the top of the rectangular shaped device 100, while the microphone 113 is placed near the bottom, thus facilitating use of the device 100 as a conventional telephony handset when making or receiving wireless telephone calls using the telephone module 138. The device in this case also has a separate push button 206 for powering the device on and off and/or locking the device or placing the device into a sleep mode, a volume adjustment button 208, a subscriber identity module (SIM) card slot 210, a headset jack 212, and an external port 124 for docking and/or charging of the device.

Turning now to FIG. 5, this figure shows the touch screen of the example multifunction device 100 during a wireless voice call. The user interface processes running in the device 100 at this point and in this example produce the following image objects that are displayed on the front screen of the touch screen 112: current time 404; battery status indicator 406; wireless communications signal strength 402; telephone number or other identifier associated with the remote device that is participating in this call (image object 409); elapsed time for the call (image object 411); and a tray 418 containing virtual buttons for frequently used commands or functions during a call, including a mute button, a speaker phone button, a hold call button, an add call button, a contacts list button, and a keypad button. Actuating the keypad button will change the display to show a virtual telephone keypad, while actuating the contact button will bring forward the user's contact list or address book.

The on-going voice call display on the touch screen 112 also shows a virtual button labeled "Request Location Info" (image object 415) that in effect prompts the user during the phone call as to whether he would like to obtain the current location of another user who is also on the call. Note that if there are more than two users on the call (such as a conference call having three or more participants), actuating the Request Location Info button 415 may result in the location awareness module 141 further prompting the user to select one of the two or more other (remote) devices (for its location information). Once the location information has been received at the local device from one or more remote devices that are participating in the phone call, the user may be given the option of launching a map/travel application that will calculate step-by-step street directions for traveling from the current location of the local device to that of the selected, remote device.

As an alternative to placing the virtual button for Requesting Location Info (image object 415) on the front display of the touch screen 112 during the phone call, this virtual button may be exposed in a contact list or address book of the user. For example, the button may be added to the name address fields associated with each contact in the list or address book. In that case, the user may need to first actuate the Contacts button in the on-going voice call screen (see FIG. 5, tray 418), to bring to foreground her contacts list. She may then scroll through her virtual list of contacts (e.g., by name) until arriving at the record associated with the other user who is on the call. After selecting the contact list record of the other user, the user will be presented with the Request Location Info button associated with the selected record. She may now actuate the button, which triggers the automatic sending of the location request message without further input from her.

FIG. 5 also shows that, on the on-going voice call screen, a further image object 413 may be displayed which is labeled "Release Location Info". This image object 413 is associated with a virtual button that, when actuated by the user of the device 100 during a voice call, causes a location release message to be sent to a selected remote device that is participating in the voice call. The location release message may contain permission to release the current location information of the local device (e.g., calculated using the local instance of the RF locator or GPS module 135). The location release message may also contain the current location information itself. The image object 413 may be highlighted or flashed or otherwise made more prominent whenever a location request message is received from a remote device (that is participating in the phone call). In some embodiments, the display of image object 413 may be suppressed until or in response to the local device receiving a location request message from a remote device.

There may also be several security aspects to the location awareness methodologies described above, as follows. To ensure authenticity of the sender and to prevent spoofing of inter-device messages, the messages may be cryptographically signed and/or encrypted before being sent. A form of public key infrastructure, PKI, security process may be used in that case, to verify each user's identity. A User of a device may be identified by a cryptographic hash of the following combination: the user's name, the user's associated contact numbers, a shared or public secret key, and a private secret key. A stored profile of another user may also be treated in a similar manner, i.e. it may be cryptographically signed and/or encrypted and then stored in the device.

To conclude, various aspects of a location awareness methodology that may be performed using mobile devices have been described. As explained above, an embodiment of the invention may be a machine-readable medium having stored thereon instructions which program a processor to perform some of the operations described above. In other embodiments, some of these operations might be performed by specific hardware components that contain hardwired logic. Those operations might alternatively be performed by any combination of programmed data processing components and custom hardware components.

A machine-readable medium may include any mechanism for storing information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM).

The invention is not limited to the specific embodiments described above. For example, although the location awareness processes have been described in the context of a voice call involving only two participants or users, the concept is applicable to a wireless or mobile conference call in which there are more than two participants. In that situation, the location awareness module 141, running in a local device, may allow its user to select from two or more remote devices to perform some of the functions described above, one remote device or user at a time. Also, although the process blocks in FIG. 2 are described sequentially, their respective operations (unless otherwise specified here) need not occur in sequence. For instance, consider block 207 in which the current location of a local device is calculated. This may, in practice, be initiated immediately upon receiving the location request message from the remote device (block 205). Alternatively, however, it may be initiated after having obtained permission from the local user to release her location information (block 209). Accordingly, other embodiments are within the scope of the claims.

What is claimed is:

1. A method for communication between a first mobile device and a second mobile device, comprising:
   during an ongoing telephone call communication session between the first and second mobile devices:
      receiving, at the second mobile device, a location request message from the first mobile device requesting location information of the second mobile device, the location request message being sent by the first device in response to detecting input corresponding to a selection of an image object displayed by the first mobile device, the image object indicating that a location request message requesting location information of the second mobile device can be sent, wherein the image object is displayed on the first mobile device simultaneously with elapsed time for the communication session; and
      in response to receiving the location request message at the second mobile device requesting location information of the second mobile device, the location request message comprising a current location of the first mobile device:
         comparing, by the second mobile device, a name of a user of the first mobile device and an address of the first mobile device to names and addresses in a stored profile associated with the second mobile device so as to determine whether the name of the user and the address matches a name and an address in the stored profile that is authorized to receive location information; and
      in response to determining that the name of the user and the address matches a name and an address in the stored profile that is authorized to receive location information, sending, from the second mobile device to the first mobile device, the location information of the second mobile device, wherein the location information includes current GPS coordinates of the second mobile device.

2. The method of claim 1 further comprising:
   during the ongoing communication session between the first and second mobile devices, receiving by the first mobile device one of a) a SMS or text message, b) a TCP/IP message, c) a UDP message, and d) a cellular network control message, from the second mobile device that contains location information of the second mobile device.

3. The method of claim 1 wherein the image object that indicates the location request message can be sent is displayed in a contact list of the first mobile device.

4. The method of claim 1, further comprising displaying a location of the second mobile device on the first mobile device, wherein displaying the location of the second mobile device comprises:
   displaying, at the first mobile device, one or more pointers on a map indicating a location of the first mobile device relative to that of the second mobile device.

5. The method of claim 4 further comprising:
   providing step by step directions at the first mobile device to travel from the location of the first mobile device to that of the second mobile device.

6. The method of claim 1 wherein the message received at the second mobile device contains location information of the first mobile device calculated by a RF-based locating methodology.

7. The method of claim 1 wherein the image object that indicates the location request message can be sent is a virtual key that is exposed in an on-going call screen of the first mobile device during the communication session.

8. The method of claim 1 wherein the image object once selected triggers the sending of the location request message without additional input.

9. The method of claim 1 wherein during the ongoing communication session between the first and second mobile devices, and after receiving the location request message requesting location information of the second mobile device, the method further comprises:
   sending permission from the second mobile device to the first mobile device, to obtain the location information of the second mobile device, prior to displaying the location of the first mobile device on a display of the second mobile device.

10. The method of claim 9 wherein said sending permission comprises:
   sending a SMS or text message from the second mobile device that contains current GPS coordinates of the second mobile device.

11. The method of claim 1, further comprising:
   upon obtaining location information from the second mobile device, the first mobile device displaying a location of the second mobile device.

12. The method of claim 1, wherein sending the location information of the second mobile device is performed prior to displaying the location of the first mobile device on a display of the second mobile device.

13. A mobile device comprising:
   one or more processors; and
   a non-transitory computer-readable storage medium storing instructions executable by the one or more processors to cause the one or more processors to:
      manage a telephone call communication session with another mobile device;
      during the telephone call communication session:

in response to receiving a location request message including current location information of said another mobile device, wherein the location request message requests location information of the mobile device, the location request message being sent by said another mobile device in response to detecting input corresponding to a selection of an image object displayed by said another mobile device, the image object indicating that a location request message requesting location information of the mobile device can be sent, wherein the image object is displayed on said another mobile device simultaneously with elapsed time for the communication session:

compare a name of a user of said another mobile device and an address of said another mobile device to names and addresses in a stored profile associated with the mobile device so as to determine whether the name of the user and the address matches a name and an address in the stored profile that is authorized to receive location information, wherein the mobile device is configured to send the location of the mobile device to said another mobile device during the telephone call communication session; and in response to determining that the name of the user and the address matches a name and an address in the stored profile that is authorized to receive location information, send, from the mobile device, the location information of the mobile device, wherein the location information includes current GPS coordinates of the mobile device.

14. The mobile device of claim 13 wherein the mobile device is configured to cryptographically sign and/or encrypt the location request message to ensure sender authenticity.

15. The mobile device of claim 14 wherein the location request message further comprises a creation date and an expiration to prevent replay spoofing.

16. A mobile device comprising:
a telephony module to manage a telephone call communication session with another mobile device;
a user interface module configured to:
    display, during the telephone call communication session, a first image object indicating that a location release message can be sent to said another mobile device, simultaneously with a second image object indicating elapsed time for the communication session; and
    detect activation of a virtual or actual key in the mobile device, or a verbal command to the mobile device, during the telephone call communication session;
a messaging module configured to send or receive a message during the telephone call session; and
a location awareness module configured to, in response to receiving a location request message comprising location information of said another mobile device from said another mobile device during the telephone call communication session:
    automatically prompt for permission to release location information;
    compare a name of a user associated with said another mobile device and an address of said another mobile device to names and addresses in a stored profile associated with a user so as to determine whether the name of the user associated with said another mobile device and the address matches a name and an address in the stored profile that is authorized to receive location information; and
    instruct the messaging module to send the location release message to said another mobile device in response to obtaining permission and determining that the name of the user and the address matches a name and an address in the stored profile that is authorized to receive location information, wherein the location release message includes current GPS coordinates of the mobile device.

17. The mobile device of claim 16 wherein the location awareness module, in response to the activation of the key or the verbal command being detected, is configured to instruct the messaging module to send the location release message addressed to said another mobile device, wherein the location release message authorizes said another mobile device to display the current location of the mobile device.

18. The mobile device of claim 16 wherein the location release message contains RF-based locator methodology coordinates of the mobile device and is sent to said another mobile device prior to displaying the location of said another mobile device on a display of the mobile device.

19. The mobile device of claim 16 wherein the stored profile is cryptographically signed and/or encrypted.

20. The mobile device of claim 16 wherein the stored profile has a creation date and an expiration date built into it.

21. The mobile device of claim 16 wherein the user associated with said another mobile device is identified within said another mobile device by: a cryptographic hash, wherein the cryptographic hash is generated from the name of the user, the user's associated contact numbers, a shared secret key, and a private secret key.

22. A mobile device comprising:
means for managing a telephone call with another mobile device;
means for displaying an image object in a user interface at the mobile device indicating that an over the air network communication message requesting location information of said another mobile device can be sent during the telephone call;
means for receiving the selection of the image object via activation of a virtual or physical key in the user interface at the mobile device;
means for detecting the selection; means for sending the over the air network communication message to said another mobile device during the telephone call;
means for instructing the sending means to send a current location of the mobile device as part of a message addressed to said another mobile device in response to receiving location information of said another mobile device during the telephone call;
means for comparing a name of a user of said another mobile device and an address of said another mobile device to names and addresses in a stored profile associated with the mobile device so as to determine whether the name of the user and the address matches a name and an address in the stored profile that is authorized to receive location information;
means for sending location information of the mobile device in response to determining that the name of the user and the address matches a name and an address in the stored profile that is authorized to receive location information, wherein the location information includes current GPS coordinates of the mobile device; and
means for displaying the location information of said another mobile device.

23. A method for communications between a first mobile device and a second mobile device, comprising:

during an ongoing telephone call communication session between the first and second mobile devices:

receiving an over the air location request message from the first mobile device requesting location information of the second mobile device, the location request message comprising location information of the first mobile device, the location request message being sent by the first device in response to detecting input corresponding to a selection of an image object displayed by the first mobile device, the image object indicating that a location request message requesting location information of the second mobile device can be sent, wherein the image object is displayed on the first mobile device simultaneously with elapsed time for the communication session;

comparing a name of a user associated with the first mobile device and an address of the first mobile device to names and addresses in a stored profile associated with a user of the second mobile device to determine whether the name of the user associated with the first mobile device and the address matches a name and an address in the stored profile that is authorized to receive location information of the second mobile device;

performing an RF-based locating methodology that determines location information of the second mobile device, wherein the determined location information includes current GPS coordinates of the second mobile device; and replying to the received message by sending the determined location information to the first mobile device in response to determining that the name of the user and the address matches a name and an address in the stored profile that is authorized to receive location information.

24. The method of claim 23 wherein the receiving the over the air location request message from the first mobile device requesting location information of the second mobile device comprises receiving the address of the first mobile device, and wherein sending the determined location information to the first mobile device is performed prior to displaying the location information of the first mobile device on a display of the second mobile device.

\* \* \* \* \*